Dec. 18, 1934.  S. C. NORTH  1,984,490
OVER RUNNING CLUTCH CONSTRUCTION
Original Filed Feb. 10, 1932  2 Sheets—Sheet 1

Fig_1_

INVENTOR.
Stanley C. North
BY Bodell & Thompson
ATTORNEYS.

Dec. 18, 1934. S. C. NORTH 1,984,490
OVER RUNNING CLUTCH CONSTRUCTION
Original Filed Feb. 10, 1932 2 Sheets-Sheet 2

INVENTOR.
Stanley C. North
BY Bodell + Thompson
ATTORNEYS.

Patented Dec. 18, 1934

1,984,490

UNITED STATES PATENT OFFICE 1,984,490

OVER-RUNNING CLUTCH CONSTRUCTION

Stanley C. North, Syracuse, N. Y., assignor of one-third to Stanley H. Keeling and one-third to Dwight H. Keeling, both of Syracuse, N. Y.

Application February 10, 1932, Serial No. 592,046
Renewed May 5, 1934

3 Claims. (Cl. 192—43)

This invention has for its object an over-running clutch mechanism, which is particularly simple and compact in construction, is composed of a few parts, and is highly efficient and durable in use, and particularly, a two-way over-running clutch which will drive in both directions and permit over-running in both directions.

The invention consists in the novel features and in the combinations and constructions hereinafter set forth and claimed.

In describing this invention, reference is had to the accompanying drawings in which like characters designate corresponding parts in all the views.

Figure 1:
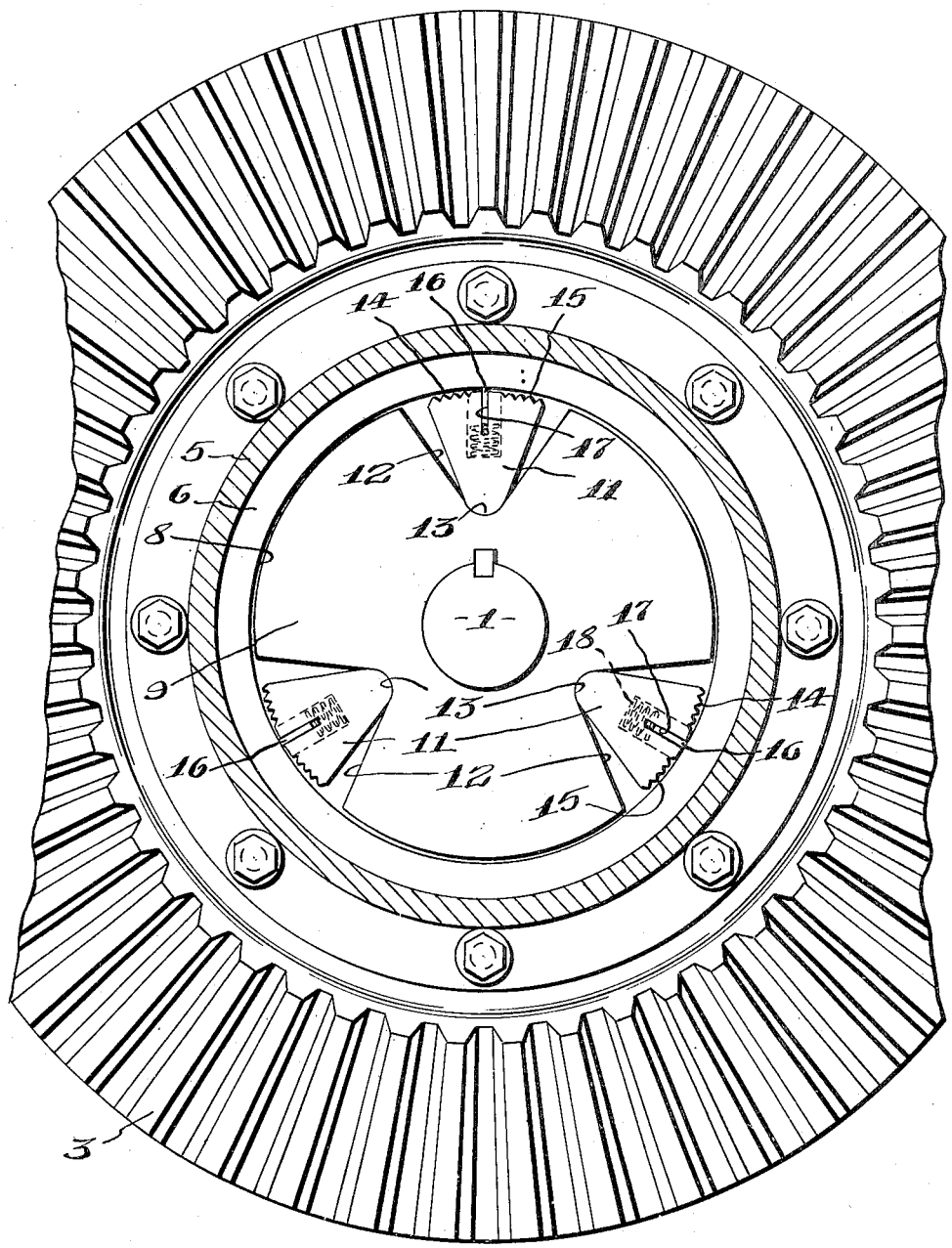
Figure 1 is a fragmentary elevation, partly in section, of this clutch, the contiguous portion of the ring gear of the rear axle of an automobile being also shown.
Figure 2:
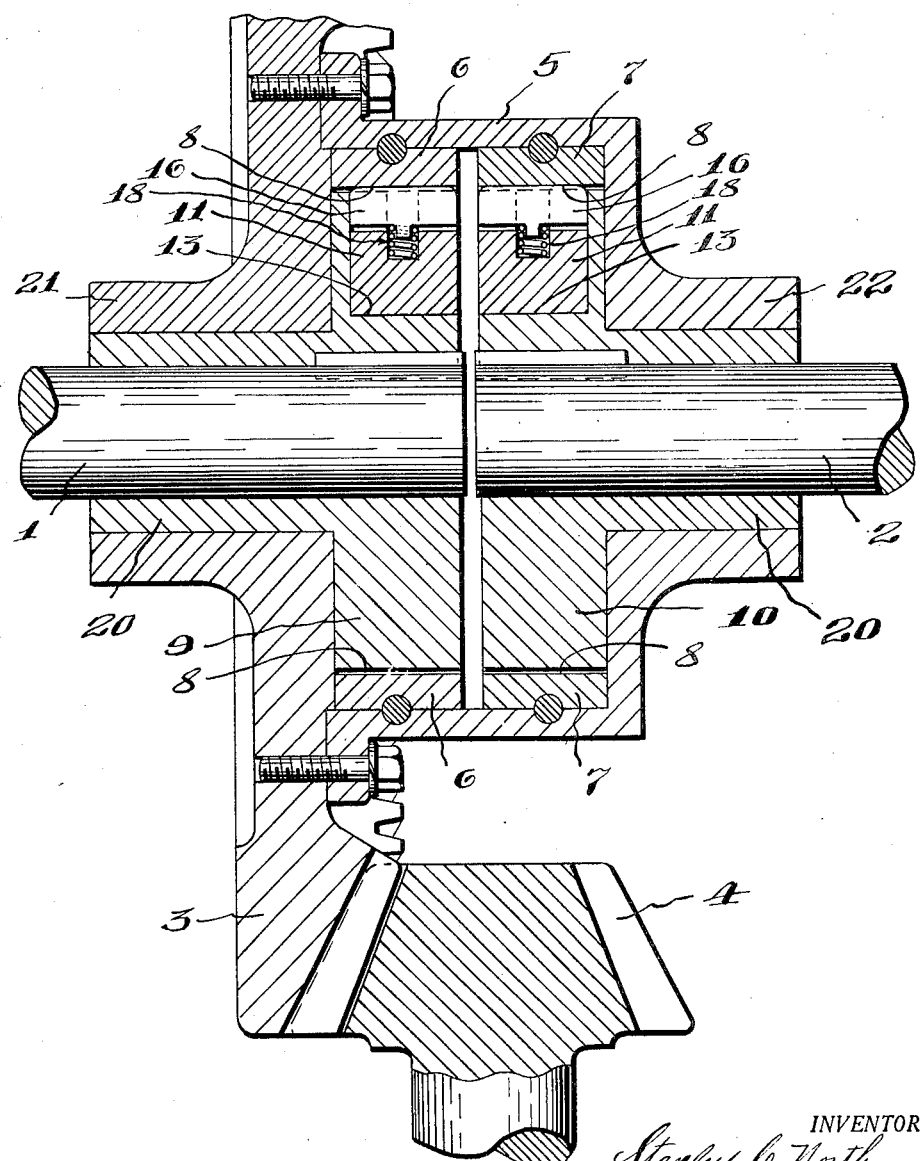
Figure 2 is a fragmentary, sectional view taken centrally on Figure 1, the driving pinion, which meshes with the ring gear, being also shown.

This over-running clutch is particularly designed to be used in place of the differential gearing in the driving axle of a motor vehicle.

1 and 2 designate generaly, the axle shafts, which are connected to the driving wheels of a motor vehicle.

3 is a ring gear, and 4 the driving pinion meshing therewith.

5 is a housing secured to one side of the ring gear and enclosing the clutch mechanism, to be presently described. The ring gear 3 and the shafts 1 and 2 constitute respectively, the driving element, and a pair of driven elements of a drive mechanism for motor vehicles. This invention relates to a two-way over-running clutch mechanism between these members.

This clutch mechanism comprises an outer annular member 6 or 7, mounted in the housing 5 and secured thereto, so that it rotates as a unit therewith, this member 6 or 7 having an internal circular, or cylindrical, clutch face 8 concentric with the axis of the shafts 1, 2, an inner member 9 or 10 mounted on the shaft 1 or 2 respectively to rotate therewith, the member 9 or 10 being preferably discoidal and located within the member 6 or 7, a double pawl carried by the member 9 or 10, pivotally connected thereto at its inner end and extending radially outwardly, the pawl having at its ends clutch faces which recede in opposite directions from the central portion or central radial line of the pawl, and means at the outer end of the pawl between such clutch faces having a touching or friction engagement with the cylindrical face 8 of the members 6 or 7, so that movement of the driving member in one direction, or the other, will shift or drag one or the other of the clutch faces of the pawl into positive clutching engagement with the clutch face 8 of the members 6 or 7 in accordance with the direction of rotation of the driving element or ring gear.

11 designates the pawl mounted in a recess 12 formed in the inner discoidal member 9 or 10 and opening through the periphery thereof, the member 9 or 10 being formed with a circular seat at 13 at the inner end of the recess, and the pawl having its end journalled in, or thrusting against, said seat. There are preferably a plurality of pawls spaced apart around each member 9 or 10.

14 and 15 are the oppositely receding clutch faces at the outer end of the pawl. These clutch faces are arc-shaped, and struck from different centers located near but eccentric to the axis of the pawl. The clutch faces 14, 15 are usually roughened or serrated.

16 is a third clutch means usually a spring-pressed blade, this blade being located in a transverse slot 17 at the outer end of the pawl centrally thereof between the clutch faces 14 and 15, the blade being slidably mounted in the slot and spring-pressed outwardly into engagement with the clutch face 8 of the members 6 or 7. The spring is here shown as located in a radial socket 18 formed in the pawl, and the slot intersects the outer end of the socket.

The members 9 and 10, in the illustrated embodiment of my invention, correspond with the side gears of a differential gearing and are keyed to the shafts 1, 2, or otherwise secured to said shafts to rotate therewith. The members 9, 10, also have hubs 20 on the shafts 1, 2, on which hubs 21 and 22 of the ring gear 3 and the housing 5 are rotatably mounted.

In operation, when a driving force forwardly, or in a counterclockwise direction, in Figure 1, is applied to the ring gear 3, the pawls 11 will be shifted in a counterclockwise direction by reason of the engagement of the spring-pressed blades 16 with the clutch faces 8 of the members 6 or 7. During this shifting of the pawls, the clutch faces 15 will be brought into clutching engagement with the faces 8, so that the driving force will be transmitted to the shafts 1 and 2. If however, one of the shafts 1 or 2 rotates faster than the other, as when the vehicle is turning a corner, the faster running shaft will cause the pawls of the corresponding member 9 or 10 secured thereto to shift back to central position by reason of the engagement of the blade 16 with the clutch face 8 of the companion clutch member 6 or 7. When the driving force applied to the ring gear 3 is reversed, as when a vehicle is backing up, the pawls 11 will be shifted in a clockwise direction, Figure 1, by reason of the engagement of the blades 16 with the clutch faces 8 of the members 6 and 7, and the over-running action of either shaft 1 or 2 can take place, the same as before. Also, the pawls permit over-running or free wheeling any time the vehicle coasts faster than the engine is driving.

This over-running clutch construction is particularly advantageous in that a single double, or two-way pawl is used, instead of a pair of pawls, as in my pending application Ser. No. 564,865.

What I claim is:

1. A driving mechanism including driving and driven elements, and a two-way over-running clutch between them, said clutch comprising an outer circular clutch member, and an inner member within said outer member, a double pawl carried by the inner member and pivoted at its inner end thereto and having its outer end provided with arcuate clutch faces at its outer end receding in opposite directions from the median radial line of the pawl, and arranged to coact with the outer clutch member, said pawl being formed with a radial socket opening through its outer end and a transverse slot between said receding clutch faces and intersecting the outer end of the socket, a clutch element slidably mounted in said slot and a spring in the socket tending to thrust said element outwardly.

2. A driving mechanism including driving and driven elements, and a two-way over-running clutch between them, said clutch comprising a member formed with an internal circular clutch face, and an inner member located within said clutch face, a double pawl carried by the inner member and shiftable in opposite directions from central position and having clutch faces at its outer end receding in opposite directions from its central portion, said clutch faces being arranged to coact with the internal clutch face, the pawl being formed with a transverse slot opening through its outer end between said oppositely receding clutch faces, and a spring-pressed blade in said slot and movable radially therein.

3. A driving mechanism including driven and driving elements, and a two-way over-running clutch between them, said clutch comprising a member formed with an internal circular clutch face, and an inner member located within said clutch face, a double pawl carried by the inner member and shiftable in opposite directions from central position and having clutch faces at its outer end receding in opposite directions from its central portion, said clutch faces being arranged to coact with the internal clutch face, and a spring pressed wiping member mounted in the pawl between the oppositely receding clutch faces and arranged to be moved radially by its spring against the said internal face.

STANLEY C. NORTH.